Jan. 15, 1963  E. A. RUDOLPH  3,073,206
CAP SCREWS WITH REPLACEABLE INSERTS
Filed April 8, 1959  2 Sheets-Sheet 1
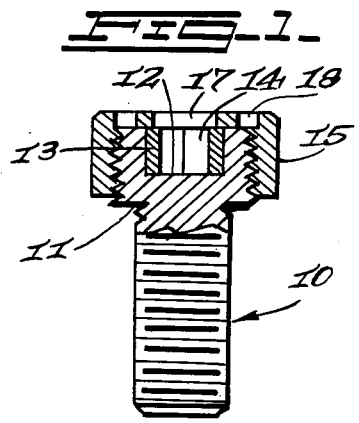
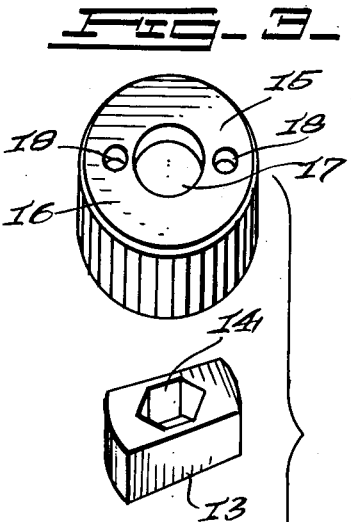
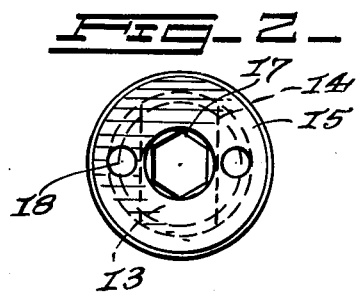
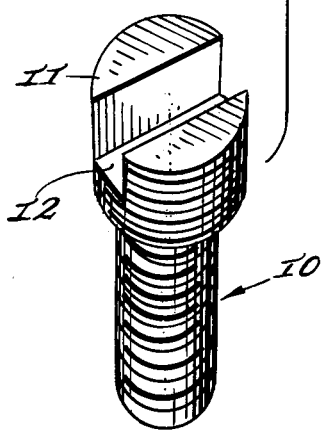
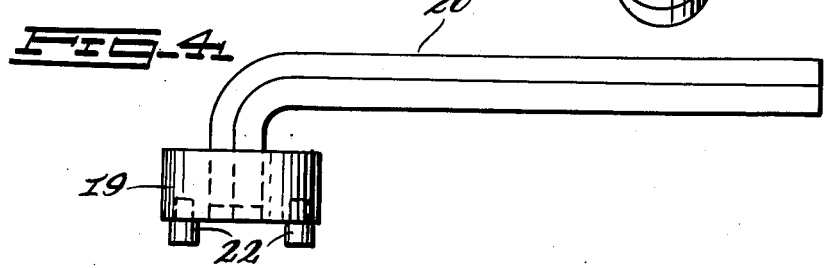
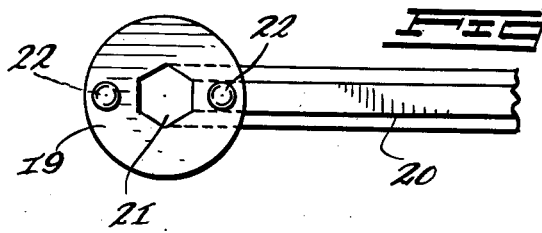
INVENTOR.
EUGENE A. RUDOLPH
BY
J. Ledermann
ATTORNEY.

Jan. 15, 1963  E. A. RUDOLPH  3,073,206
CAP SCREWS WITH REPLACEABLE INSERTS
Filed April 8, 1959  2 Sheets-Sheet 2
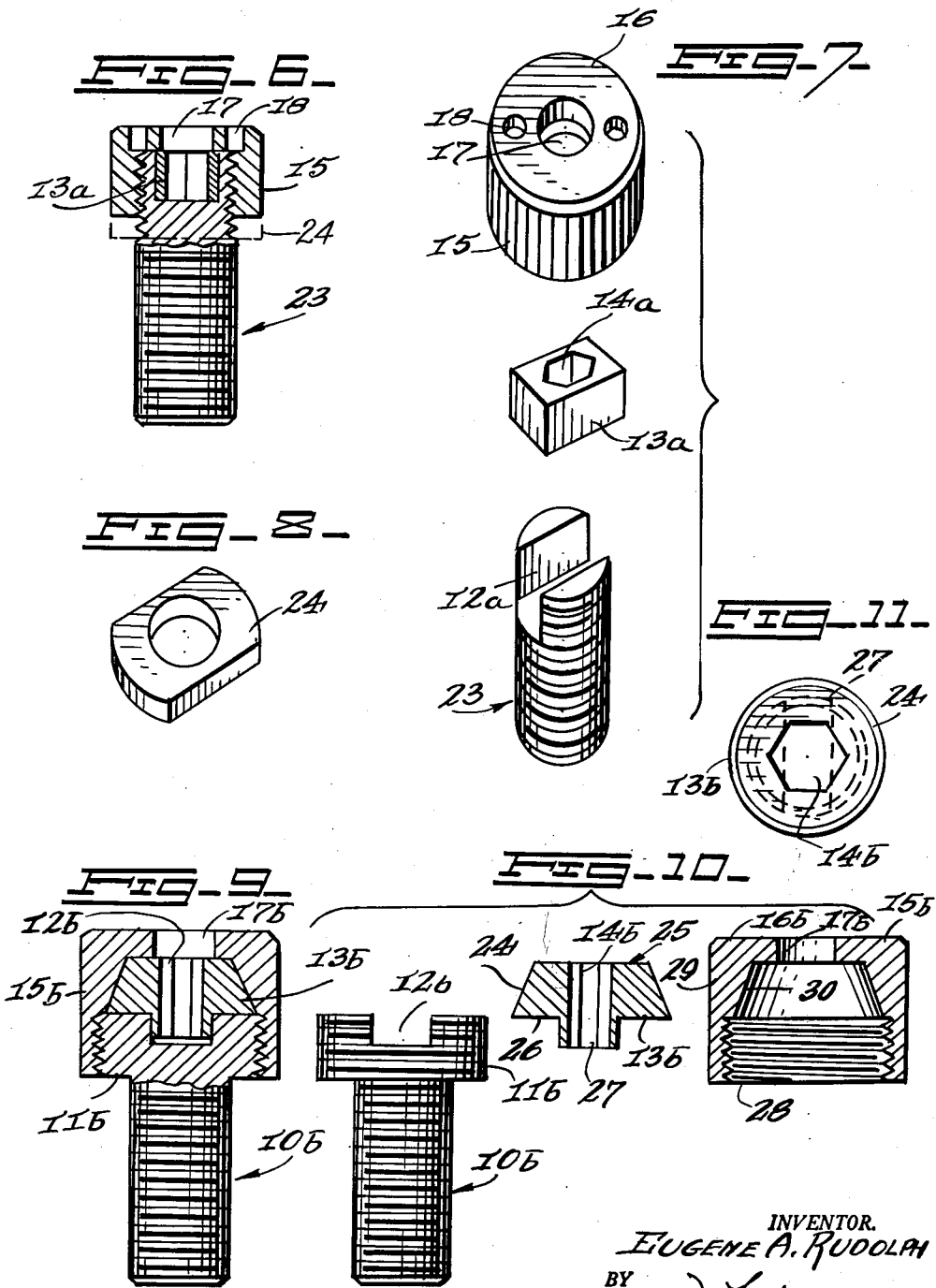
INVENTOR.
EUGENE A. RUDOLPH
BY J. Ledermann
ATTORNEY.

United States Patent Office 3,073,206
Patented Jan. 15, 1963

3,073,206
CAP SCREWS WITH REPLACEABLE INSERTS
Eugene A. Rudolph, 137 Clay Pit Road,
Staten Island 9, N.Y.
Filed Apr. 8, 1959, Ser. No. 805,068
2 Claims. (Cl. 85—45)

This invention relates to cap screws of the type having a socket in the head thereof so that the screw may be turned by insertion of a complementary tool or wrench into the socket. Such screws are also frequently referred to as "Allen" screws.

As a consequence of laborious or frequent turning of such a screw, or for other reasons, the socket is apt to become deformed so that the complementary wrench or other tool cannot obtain a firm registration in the socket, with the consequence of necessitating punching, chiselling or even in some cases the use of a hacksaw, to loosen or remove the screw, especially where it is countersunk.

It is an object of the present invention to provide useful novel improvements in cap screws of the type mentioned above, whereby the screws may be readily removed from their seats regardless of the condition or state of wear of the sockets therein, and whereby when the socket in a screw has been far worn its life may be renewed without having to discard it in favor of a new screw.

Another object of the invention is the provision of new and useful improvements in cap screws wherein they are provided with disposable inserts containing the socket, and with means for locking the insert on the screw, the latter means being readily detachable so that when such an insert has become too far worn it may be readily replaced by a new insert. Thus, when such an improved screw cannot be removed because of its worn socket, the insert containing a socket can readily be replaced by one with a new socket and hence the screw may readily be removed.

The above as well as additional and more specific objects will be clarified in the following description wherein reference numerals refer to like-numbered parts in the accompanying drawings. It is to be noted that the drawings are intended primarily for the purpose of illustration and that it is therefore neither desired nor intended to limit the invention necessarily to any or all of the details shown or described except insofar as they may be deemed essential to the invention.

Referring briefly to the drawings,

FIG. 1 is a longitudinal sectional view through an improved cap screw, illustrating embodiments of the present invention.

FIG. 2 is a top plan view of the same.

FIG. 3 is an exploded perspective view of the improved cap screw shown in FIGS. 1 and 2.

FIG. 4 is a side elevational view of a wrench which may be used to remove the locking head which secures the removable insert in the screw cap.

FIG. 5 is a bottom plan view of FIG. 4.

FIG. 6 is a longitudinal sectional view through a slightly modified form of the improved cap screw.

FIG. 7 is an exploded perspective view of the screw shown in FIG. 6.

FIG. 8 is a perspective view of a lock nut which may be used with the screws of FIGS. 6 and 7.

FIG. 9 is a longitudinal sectional view through another modified form of the improved screw cap.

FIG. 10 is a view similar to FIG. 9 except that the component parts of the improved cap screws are shown separated from each other.

FIG. 11 is a top plan view of the insert shown in FIG. 10.

Referring in detail to the drawings, the numeral 10, FIGS. 1 and 3, indicates a screw having an externally threaded enlarged head 11 having a diametrical groove 12, U-shaped in cross-section, through the top thereof. An insert 13, complementary to the groove 12 and registrable therein, is provided; preferably the end walls of the insert are rounded to conform to the curvature of the head 11 and thus to prevent longitudinal movement of the insert along the groove. The insert has a polygonal socket, shown as hexagonal at 14, therein, equivalent or identical to the socket in the common type of cap screw. Preferably the depth of the insert is equal to the depth of the groove 12 so that the top surface of the insert is flush with the top surface of the head 11.

An internally threaded cylindrical hood or annular cap 15 is adapted to be screwed down upon the threaded head 11 of the screw 10 after the insert 13 has been registered in the groove 12. The top or roof 16 of the hood is provided with an axial passage or opening 17 therethrough, whose diameter is equal to or very slightly greater than the maximum diagonal of the socket 14. Diametrically spaced substantially smaller openings 18 are also provided in the roof 16.

When the complete improved screw is assembled as shown in FIG. 1, it is apparent that upon insertion of an appropriate socket wrench, such as that shown at 20 in FIG. 4, for example, into the socket 14 through the passage 17, the screw may be readily turned in either direction. In case the socket 14 has become too far worn so that the wrench will slip therein, the hood may be easily removed through utilization of an adapter 19 applied to the wrench 20. The adapter consists of a block, preferably cylindrical, having a polygonal passage 21 therethrough complementary to the socket 14 so that the same wrench may be used to fit the socket 14 and the adapter. On one side the adapter has projecting prongs or pins 22 complementary to the openings 18 in the hood 15, the tool thus being converted to a spanner wrench. By applying the adapter to the top of the assembled screw of FIG. 1 and registering the pins 22 in the openings 18, the hood may be turned by means of the wrench 20. Thus a worn cap screw may easily be removed by first substituting a replacement insert 13 for the worn one, and this is of especial significance for a countersunk screw.

In the modification illustrated in FIGS. 6 and 7, the same hood 15 is used but in this case it is applied to a screw 23 lacking an enlarged head; of course in every case the hood will be provided in the proper size to fit the screw. In FIGS. 6 and 7 those parts which are the same or equivalent to parts described in relation to FIGS. 1, 2 and 3 are indicated by the same reference numerals followed by the suffix "a." Just as a variation, the insert 13a is shown with flat ends rather than with the rounded ends of the insert 13; however, whether or not the ends are rounded or flat is a matter of choice although it is believed that they should preferably be rounded.

In FIG. 8 a lock nut 24 is shown, which is adapted to be screwed into position under the hood 15 as illustrated in phantom in FIG. 6, as an accessory provided for use when and if desired.

FIGS. 9 and 10 illustrate an additional and more varied modification of the improved cap screw. Herein also parts which are similar or equivalent to parts described in relation to FIGS. 1, 2 and 3 bear the same reference numerals except that they are followed by the suffix "b." Both the hood 15b and the insert 13b, however, are substantially modified as compared with the equivalent elements shown in FIGS. 1, 2 and 3. The groove 12b is substantially the same as the groove 12. The insert 13b is in the form of a frustum of a cone having the conical wall 24, the flat top surface 25 and the flat bottom surface 26. From the bottom 26 a transverse projection or ridge 27, U-shaped in cross-section and complementary to the groove 12b, extends downward at right angles to the surface 26. Thus the insert 13b is adapted to sit on the screw head 11b with the ridge 27 registering in the groove 12b.

The hood 15b has the lower portion 28 of the apron or wall thereof threaded internally and complementarily to the screw head 11b. The upper portion 29 of the cap apron under the roof 16b has an internal conical wall 30 complementary to the conical wall 24 of the insert 13b. The component parts shown in FIG. 10 appear, when assembled, as illustrated in FIG. 9.

In all cases, of course, the dimensions of all parts, including sockets and passages and openings, will conform to standard sizes and dimensions.

The invention having thus been described, what is claimed and desired to be secured by Letters Patent is as follows:

1. A screw having an enlarged cylindrical head provided with a transverse diametrical groove U-shaped in cross-section and of a constant width and depth extending through said head, a block having the same cross-sectional dimensions and length as said groove registering loosely in said groove, said block having a polygonal socket extending downward thereinto through the top thereof aligned with the axis of the screw, a hood including a roof and an apron depending from the roof having the lower portion thereof internally threaded and screwed down upon said head of the screw, said roof having an axial passage therethrough of a diameter at least as long as the largest diagonal of said socket in a plane at right angles to the axis of the socket, said roof having a pair of diametrically spaced openings therein equidistantly spaced from said axial opening adapted to receive the prongs of a spanner wrench, said hood having the interior wall of the upper portion of said apron frusto-conical in shape thereby defining a frusto-conical recess, a complementary frusto-conical body registrable in said recess, said block being integral with said body and extending from the underside thereof along a diameter thereof, said body having an axial polygonal socket of the same number of sides as said socket in the block and being aligned therewith.

2. A screw having an enlarged head provided with a transverse diametrical groove extending therethrough, a frusto-conical body having a diametrical ridge on the underside thereof, said ridge having dimensions complementary to the dimensions of said groove and registering loosely therein, a hood having a roof and an apron depending therefrom, said apron having the lower portion thereof internally threaded and adapted to be screw down upon said head of the screw, the interior wall of the upper portion of said apron being frusto-conical in shape thereby defining a frusto-conical recess, said body complementary to said recess and being registering therein, said body having an axial polygonal socket extending downward through the top thereof, said hood having an axial passage through said roof of longer diameter than the largest diagonal of the socket in a plane at right angles to the axis of the socket, and spanner wrench receiving openings in said roof.

References Cited in the file of this patent
UNITED STATES PATENTS

| | | |
|---|---|---|
| 824,983 | Farrington | July 3, 1906 |
| 1,055,294 | Stevenson | Mar. 5, 1913 |
| 1,330,673 | Anderson | Feb. 10, 1920 |
| 2,286,950 | Breedlove | June 16, 1942 |
| 2,931,265 | De Lacy | Apr. 5, 1960 |

FOREIGN PATENTS

| | | |
|---|---|---|
| 24,846 | Great Britain | Aug. 6, 1908 |
| 501,548 | Great Britain | Mar. 1, 1939 |